Figure 1:
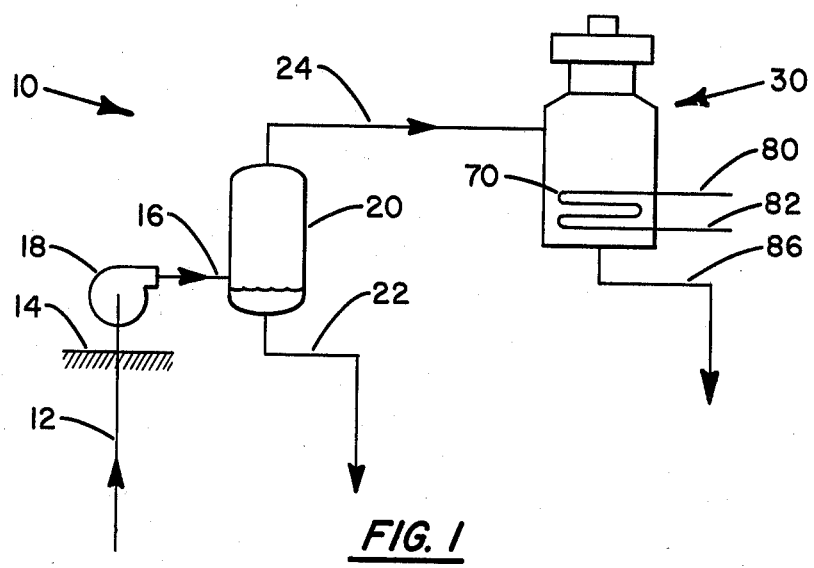

United States Patent [19]

Shields

[11] 4,291,540
[45] Sep. 29, 1981

[54] POWER GENERATION UNIT

[75] Inventor: J. Rodger Shields, Pittsburgh, Pa.

[73] Assignee: Carrier Corporation, Syracuse, N.Y.

[21] Appl. No.: 953,517

[22] Filed: Oct. 23, 1978

[51] Int. Cl.$^3$ ............................................. F01B 31/16
[52] U.S. Cl. ............................. 60/694; 60/DIG. 10; 415/207
[58] Field of Search ................. 60/690, 692, 641, 398, 60/DIG. 10, 685, 694; 290/52; 415/207, 219 R

[56] References Cited

U.S. PATENT DOCUMENTS

| | | | |
|---|---|---|---|
| 3,625,630 | 12/1971 | Soo | 415/207 |
| 3,957,108 | 5/1976 | Huisen | 60/641 X |
| 4,049,972 | 9/1977 | Crowdy et al. | 290/52 |
| 4,189,647 | 2/1980 | Wittig | 60/641 X |
| 4,189,924 | 2/1980 | LaCoste | 650/641 |

*Primary Examiner*—Allen M. Ostrager
*Assistant Examiner*—Stephen F. Husar

*Attorney, Agent, or Firm*—J. Raymond Curtin; John S. Sensny

[57] ABSTRACT

A power generation unit comprising a turbine for extracting energy from a vaporous power fluid and including means for directing the power fluid generally downward therethrough, a tubine wheel wherein the flow of the power fluid past the turbine wheel causes rotation thereof, and a vapor discharge port substantially directly below and at least substantially coextensive with the horizontal cross section of the vapor flow path as the vapor flows past the turbine wheel. The unit further comprises power means for generating power, means for transmitting energy extracted from the power fluid by the turbine to the power means to generate the power, and a condenser located below the turbine for condensing the vaporous power fluid and including a vapor inlet port substantially coextensive with the vapor discharge port of the turbine.

1 Claim, 2 Drawing Figures

POWER GENERATION UNIT

BACKGROUND OF THE INVENTION

This invention relates generally to the generation of power, and more particularly to a power generation unit specifically well suited for generating power from low temperature energy sources especially geothermal energy.

The rapidly diminishing sources of fossil fuels, combined with the polluting effects of both fossil fuels and nuclear fuels, has resulted in considerable attention being directed toward utilizing energy such as low temperature energy, which heretofore has not generally been used, to generate power, specifically electric power. Low temperature energy may be available, for example, in the form of waste heat produced by many manufacturing processes or as solar or geothermal heated hot water or steam. The present invention is directed to a unique power generation unit well suited for use with low temperature energy, particularly geothermal energy. Often, geothermal energy is in the form of a hot brine solution located below the earth's surface. A well is drilled through the surface of the earth to the brine solution, and the hot brine passes upwards, through the well to the surface. Typically, the brine partially vaporizes as it flows upwards, and the well yields a mixture of steam and hot brine. The energy within the mixture is then transformed into a more practical form, such as electric power.

However, available systems for transforming the geothermal energy contained within the mixture of steam and hot brine generally operate at relatively low efficiencies and often have additional serious disadvantages. For example, in one method, the hot geothermal brine is passed through a heat exchanger, transferring heat to a working fluid, and the working fluid is used to drive a conventional turbine generator unit. This method, though, has the disadvantage that a relatively large and expensive heat exchanger is required to effect the necessary heat exchange between the hot brine and the working fluid. A second method of recovering energy contained in the hot brine and steam mixture is to decrease the pressure of the mixture, which increases the amount of vapor in the mixture. The vapor is then separated from the liquid brine and fed to a turbine for the production of mechanical energy. With this method, however, the vapor is at a comparatively low pressure. Since conventional turbines operate relatively inefficiently at low pressures, this method typically results in an inefficient recovery of the geothermal energy.

SUMMARY OF THE INVENTION

An object of the present invention is to provide a power generation unit well adapted for use with low temperature energy sources.

Another object of the present invention is to transform geothermal energy into a more practical form.

A further object of this invention is to improve an in situ system for generating power from geothermal energy.

Another object of the present invention is to reduce parasitic energy losses within a turbine-generator-condenser unit.

A still further object of this invention is to provide a very compact and economical turbine-generator-condenser unit.

These and other objectives are attained with a power generation unit comprising means for extracting energy from a vaporous power fluid and including means for directing the power fluid generally downward therethrough, rotatable means wherein the flow of the power fluid past the rotatable means causes rotation thereof, and a vapor discharge port substantially directly below and at least substantially coextensive with the horizontal cross section of the vapor flow path as the vapor flows past the rotatable means. The unit further comprises power means for generating power, means for transmitting energy extracted from the power fluid by the energy extracting means to the power means to generate power, and a condenser located below the energy extracting means for condensing the vaporous power fluid and including a vapor inlet port substantially coextensive with the vapor discharge port of the energy extracting means.

A BRIEF DESCRIPTION OF THE DRAWINGS

Figure 2:
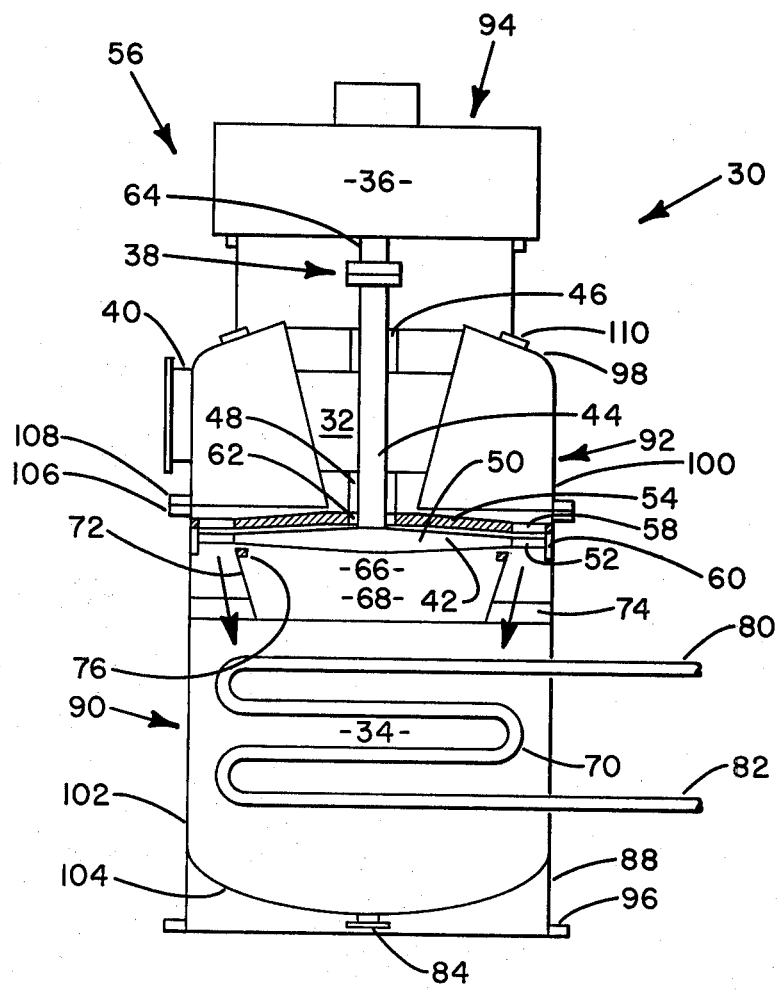

FIG. 1 is a schematic representation of a geothermal power system utilizing the teachings of the present invention; and FIG. 2 is a schematic drawing of a power generation unit constructed according to the present invention.

A DETAILED DESCRIPTION OF THE PREFERRED EMBODIMENT

A preferred embodiment of the present invention, described in detail below, is arranged to utilize geothermal energy to generate power. It should be clear, though, that many well known energy sources such as solar energy or the normally unrecovered heat energy produced by many manufacturing processes can likewise be employed in the practice of the present invention. Referring to the drawings, FIG. 1 is a schematic representation of in situ geothermal power system referenced generally as 10. System 10 includes well 12 that extends down from surface 14 of the ground into a subterranean geothermal brine reservoir. The pressure of the geothermal brine may or may not be sufficient to cause the brine to naturally flow upward through well 12 to surface 14; and, if the brine pressure is not sufficient, then a surface or down hole pump (not shown) can be provided to assist the upward flow of the brine. Typically, as the brine passes upward, part of it flashes into the vapor form. Thus, well 12 yields a mixture of vapor or steam and hot, liquid brine.

The yield from well 12 is delivered through circuit 16, which may have booster pump 18 therein, to separator 20. In separator 20, the pressure of the mixture of steam and brine is decreased, increasing the vapor fraction of the mixture. The liquid brine fraction, being more dense than the vapor fraction, accumulates in the lower portion of separator 20 and is discarded therefrom via discharge conduit 22. The vapor fraction passes from separator 20, through line 24, and to power generation unit 30.

Power generation unit 30, shown in greater detail in FIG. 2, comrises means such as turbine 32 for extracting energy from a vaporous power fluid, a condenser 34 located below the turbine for condensing the vaporous power fluid, power means 36 for generating power, and means 38 for transmitting energy extracted from the power fluid by the turbine to the power means to generate power. Turbine 32 includes means such as inlet scroll 40, which is connected to separator 20 via fluid line 24, for directing the power fluid generally downward through the turbine, and rotatable means such a turbine wheel 42 wherein the flow of the power fluid past the turbine wheel causes rotation thereof. More specifically, turbine 32 includes generally vertical turbine shaft 44 and turbine wheel 42 is supported by the turbine shaft for rotation therewith. Turbine shaft 44 is axially and rotatably supported, generally along the axial center line of power generation unit 30, by upper bearing assembly 46 and lower bearing assembly 48. The specific configuration of assemblies 46 and 48 make no part of the present invention, and any of many well known thrust and journal bearing assemblies may be used to support turbine shaft 44. Turbine wheel 42 includes hub 50 and a plurality of rotor blades 52. Hub 50 is secured by any suitable means to a lower end of shaft 44 for rotation therewith and extends radially outward therefrom, and rotor blades 52 extend outward from hub 50. Stator blades 54 are secured to casing 56 of power generation unit 30 above turbine wheel 42 and define a plurality of nozzles 58. In a manner well known in the art, as the power fluid passes downward through turbine 32, nozzles 58 direct the fluid toward rotor blades 52 and, as the vapor impinges on the rotor blades and passes past the rotor blades and turbine wheel 42, the vapor rotates the turbine wheel and turbine shaft 44. Annular seal 60 may be provided between rotor blades 52 and casing 56 to prevent the power fluid from passing therebetween, and seal 62 may be provided between stator blades 54 and turbine shaft 44 to prevent vapor escaping therethrough. Seal 62 may comprise part of lower bearing assembly 48.

Perferably, power means 36 includes power shaft 64 wherein rotation of the power shaft generates power, and energy transmitting means 38 includes a shaft coupling for connecting turbine shaft 44 and the power shaft wherein rotation of the turbine shaft rotates the power shaft. Even more preferably, power means 36 includes an electric generator wherein rotation of power shaft 64 produces electric power, and the power shaft is generally vertical and aligned with turbine shaft 44. As may be appreciated, since an electric current is easily transported and easily adapted to a variety of uses, the energy contained within an electric current has many practical advantages over the energy contained within geothermal brine. Thus, system 10 transforms geothermal energy into a form—an electric current—in which its practical usefulness is significantly increased.

After passing past rotor blades 52 and through turbine wheel 42, the vaporous power fluid continues on an generally downward, vertical flow path through turbine discharge port 66, through condenser inlet port 68, and into condenser 34. Vapor discharge port 66 is substantially directly below and at least substantially coextensive with the horizontal cross section of the vapor flow path as the vapor flows past turbine wheel 42, and condenser inlet port 68 is substantially coextensive with the turbine discharge port. In the illustrated embodiment, discharge port or bottom 66 of turbine 32 is completely open, defined by a horizontal cross sectional area of casing 56 below turbine wheel 42. Further, inlet port or top 68 of condenser 34 is also completely open, defined by a horizontal cross sectional area of casing 56 above heat exchanger 70, discussed below. Because vapor discharge port 66 is substantially directly below and at least substantially coextensive with the horizontal cross section of the vapor flow path as the vapor flows generally downward and vertically past turbine wheel 42, and condenser inlet port 68 is substantially coextensive with the turbine discharge port, vapor encounters a minimum of resistance as it flows from the turbine wheel, out of turbine 32 and into condenser 34. This minimizes any type of pressure buildup at discharge port 66 of turbine 32. In this manner, the vapor pressure drop across turbine 32 is increased, increasing the efficiency of the turbine. If turbine 32 is used with low pressure vapor or steam, then, with respect to the vapor pressure drop across the turbine, even a small increase in terms of absolute values can produce a significant increase in terms of relative value, and a relatively significant increase in the pressure drop across the turbine can substantially improve the efficiency of the turbine. Thus, the teachings of the present invention are particularly advantageous when low pressure steam such as the steam often available from a low temperature energy source, for example a geothermal energy source, is used to drive the turbine.

In a perferred embodiment, power generation unit 30 also includes means such as baffle 72 for guiding vapor from turbine wheel 42 and into condenser 34. Baffle 72 has the shape of a truncated cone, is supported within unit 30 by bracket 74, and is positioned within unit 30 so that the longitudinal axes of the truncated cone and the power generation unit are substantially colinear. The end of baffle 72 having the larger radius, is located directly below turbine wheel 42, and the side of the baffle extends downward and inward, toward and into condenser 34. As vapor flows past turbine wheel 42, the vapor continues downward and is guided by casing 56 and baffle 72 through the open discharge port 66 of turbine 32, through the open inlet port 68 of condenser 34, and into the condenser. Because baffle 72 extends inwards as well as downwards, the vapor can expand as it passes the baffle, preventing any type of pressure buildup as the vapor flows past the baffle. Reinforcing ring 76 may be secured to the inside of baffle 72 at the upper end thereof.

Heat exchange coil 70 is located in condenser 34 and is connected to any suitable source of a cooling liquid by means of fluid lines 80 and 82. For example, the source of the cooling liquid may be a conventional cooling water tower (not shown). The cooling liquid passes through heat exchanger 70 and absorbs heat from the vapor passing through condenser 34, cooling the vapor. As the vapor cools, it condenses. As the vapor condenses, its pressure decreases, and this pressure decrease assists the downward flow of the vapor from turbine 32, past baffle 72, and into condenser 34. Condensed fluid collects at the bottom of condenser 34 and may be discharged therefrom via valve 84 and discharge line 86 (shown only in FIG. 1).

Preferably, turbine 32, condenser 34, and power means 36 are contained within a single casing 56. Referring in more detail to the construction of casing 56, the casing includes base 88, lower section 90, middle section 92, and top section 94. Base 88 is the primary support for power generation unit 30 and includes annular flange 96 located around the bottom periphery thereof for increasing the stability of the power generation unit. Top section 94 houses power means 36. Middle section 92 includes top portion 98 and cylindrical side portion 100. Lower section 90 includes cylindrical side portion 102, which has a radius substantially equal to the radius of side portion 100, and rounded bottom portion 104. Lower section 90, middle section 92, and top section 94 are formed separately and then joined together. Lower section 90 includes annular flange 106 located at the top thereof, middle section 92 includes annular flange 108 located at the bottom thereof, and the lower section and the middle section are joined by uniting flanges 106 and 108. These two flanges may be united in any suitable manner as, for example, by bolts or welding. Ring 110 is provided for joining top section 94 to middle section 92, and any of many arrangements well known to those skilled in the art may be used to secure the top section to the middle section by means of the ring. One arrangement, as an illustration, would be to join the inside of ring 110 to top section 94 by pins, screws, welding or the like and to join the bottom side of the ring to the top portion 98 of middle section 92 again by bolts, welding or the like. As may be appreciated, the present invention is not limited to a particular method or manner of joining the separate section 90, 92, and 94.

The above-discussed single-casing structure for power generation unit 30 eliminates the need for and cost of interstage piping and other connections. This reduces the cost of power generation unit 30 and makes the unit more compact, increasing the flexibility and facilitating handling of the unit. Moreover, the single-casing structure itself facilitates handling and transporting of power generation unit 30—a factor which is of importance since many geothermal power sites are relatively remote from manufacturing facilities.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A power generation unit comprising:
   a turbine for extracting energy from a vaporous power fluid and including an inlet scroll for directing the power fluid generally downward through the turbine, a generally vertical, rotatable turbine shaft, a turbine wheel supported by the turbine shaft for rotation therewith and having a hub and a plurality of blades extending outward therefrom wherein the flow of the power fluid past the turbine wheels causes rotation thereof, and a vapor discharge port;
   an electric generator for generating an electric current and including a generally vertical, rotatable power shaft aligned with the turbine shaft;
   a shaft coupling connecting the turbine shaft and the power shaft to transmit rotary motion from the turbine shaft to the power shaft to generate an electric current;
   a condenser located directly below the turbine, and including a condenser heat exchanger for condensing the vaporous power fluid and a vapor inlet port;
   a baffle having a first end located directly below the turbine wheel, extending downward and inward therefrom, toward and into the condenser, and defining an annular chamber below the turbine wheel for receiving the power fluid flowing therepast, guiding the fluid away from the hub of the turbine wheel, and conducting the fluid downward through the discharge port of the turbine, through the inlet port of the condenser, and into the condenser, wherein
   the horizontal cross sectional area of the annular chamber increases in the downward direction to allow the power fluid to expand as it flows therethrough;
   a casing enclosing the turbine, the electric generator, the condenser, and the baffle, and including
   a top section housing the electric generator,
   a middle section having a top portion, a cylindrical side portion, and an annular flange located at the bottom of the middle section,
   a lower section including a cylindrical side portion having a radius substantially equal to the radius of the side portion of the middle section, a rounded bottom portion, and an annular flange located at the top of the lower section secured to the annular flange of the middle section to join the lower and middle sections together, and
   a ring joining the top section to the middle section; and
   bracket means extending between the baffle and the casing to support the baffle therewithin; and wherein
   the discharge port of the turbine is defined by a horizontal cross sectional area of the casing below the turbine wheel, is completely open, and is substantially directly below and at least substantially coextensive with the horizontal cross section of the vapor flow path as the vapor flows past the turbine wheel, and
   the inlet port of the condenser is defined by a horizontal cross sectional area of the casing above the condenser heat exchanger, is completely open, and is substantially coextensive with the vapor discharge port of the turbine.

* * * * *